United States Patent
Zhang et al.

(10) Patent No.: US 9,928,770 B2
(45) Date of Patent: Mar. 27, 2018

(54) METHOD FOR ADJUSTING DISPLAY EFFECT AND ELECTRONIC APPARATUS

(71) Applicant: Lenovo (Beijing) Co., Ltd., Beijing (CN)

(72) Inventors: Yu Zhang, Beijing (CN); Chao Zhang, Beijing (CN)

(73) Assignee: LENOVO (BEIJING) CO., LTD, Haidian District, Beijing (CN)

( * ) Notice: Subject to any disclaimer, the term of this patent is extended or adjusted under 35 U.S.C. 154(b) by 144 days.

(21) Appl. No.: 14/583,621

(22) Filed: Dec. 27, 2014

(65) Prior Publication Data
US 2016/0063909 A1 Mar. 3, 2016

(30) Foreign Application Priority Data
Sep. 2, 2014 (CN) .......................... 2014 1 0442740

(51) Int. Cl.
| G09G 3/22 | (2006.01) |
| G09G 3/20 | (2006.01) |
| G06F 3/01 | (2006.01) |
| G09G 5/10 | (2006.01) |

(52) U.S. Cl.
CPC .......... *G09G 3/2003* (2013.01); *G06F 3/013* (2013.01); *G09G 5/10* (2013.01); *G09G 2320/0633* (2013.01); *G09G 2354/00* (2013.01)

(58) Field of Classification Search
None
See application file for complete search history.

(56) References Cited

U.S. PATENT DOCUMENTS

| 2011/0080421 A1* | 4/2011 | Capener ............... G09G 5/10 345/589 |
| 2011/0181541 A1* | 7/2011 | Kuo ................. G06F 1/1637 345/174 |

(Continued)

FOREIGN PATENT DOCUMENTS

| CN | 102436306 | 5/2012 |
| CN | 103780957 | 5/2014 |

OTHER PUBLICATIONS

First Office Action dated Nov. 16, 2018 (13 pages including English translation) from Chinese priority Application No. 201410442740.0.

*Primary Examiner* — Tize Ma
(74) *Attorney, Agent, or Firm* — Brinks Gilson & Lione; G. Peter Nichols

(57) ABSTRACT

A method for adjusting a display effect and an electronic apparatus that includes a frame body, a fixing device, and a functional main body section. The functional main body section includes a display device disposed in the frame body. When a user views a first display content in the first display region in a first interactive mode, a light beam emitted by the display device is incident upon the user's eyes so that the user perceives a first perception picture. The display parameter of the display device is adjusted by obtaining the adjustment parameter for instructing to adjust the display effect of the first perception picture, and thereby generating the corresponding control signal, so that a current display effect of the first perception picture is different from a display effect of the first perception picture before the adjustment.

17 Claims, 8 Drawing Sheets

(56) References Cited

U.S. PATENT DOCUMENTS

| 2013/0114043 | A1* | 5/2013 | Balan | H04N 13/044 |
| | | | | 351/210 |
| 2015/0145777 | A1* | 5/2015 | He | G06K 9/0061 |
| | | | | 345/158 |
| 2015/0269907 | A1* | 9/2015 | Hadas | G09G 5/10 |
| | | | | 345/589 |

* cited by examiner

METHOD FOR ADJUSTING DISPLAY EFFECT AND ELECTRONIC APPARATUS

This application claims priority to Chinese patent application No. 201410442740.0 filed on Sep. 2, 2014, the entire contents of which are incorporated herein by reference.

The present application relates to a field of wearable electronic apparatus application, and more particularly, to a method for adjusting a display effect and an electronic apparatus.

BACKGROUND

Currently, with rapid development of technology, more and more wearable electronic apparatuses come into people's lives. Human beings watch screen and read book in a mode which is no longer limited to remote view. Emergence of wearable apparatuses such as a near-eye display and a near-eye viewed Smartwatch satisfies people's demand for close-range viewing.

For such an electronic apparatus, because an actual display light-emitting source thereof is close to a user's eyes, in order that the user can comfortably view in a close range, it is necessary to adjust display brightness thereof. However, the existing electronic apparatus does not have a function of adjusting the display brightness. Thus, when different users wear the electronic apparatus, requirements of all the users on comfort degree of the display brightness usually cannot be satisfied, and the users' eyes are even hurt due to excessively strong display brightness of the display light-emitting source.

SUMMARY

In view of the above, the present application provides a method for adjusting a display effect and a near-eye electronic apparatus, which enables display brightness of the electronic apparatus to be adjusted, such that requirements of all the users on comfort degree of the display brightness can be satisfied, and the users' eyes are protected from excessively strong display brightness.

To achieve the above objective, the present application provides technical solutions described as below.

In one aspect, an embodiment of the present application provides a method for adjusting a display effect of a display device, the method comprising: obtaining an adjustment parameter, the adjustment parameter being used for instructing to adjust a display effect of a first perception picture; generating a control signal according to the adjustment parameter; adjusting display parameter of the display device based on the control signal to correspondingly adjust the display effect of the first perception picture.

In another aspect, an embodiment of the present application provides an electronic apparatus. An electronic apparatus may comprises: a sensing device, for obtaining an adjustment parameter, the adjustment parameter being used for instructing to adjust a display effect of a first perception picture; a control circuit, for generating a control signal according to the adjustment parameter of the sensing device; an adjustment circuit, for adjusting display parameter of the display device based on the control signal, to correspondingly adjust the display effect of the first perception picture.

Thus, as compared with the prior art, the present application provides a method for adjusting a display effect and an electronic apparatus. The electronic apparatus comprises a frame body, a fixing device connected to the frame body which is for fixing the electronic apparatus to a support body, and a functional main body section. The functional main body section comprises a display device disposed in the frame body and having a first display region. When a user views a first display content in the first display region in a first interactive mode, a light beam emitted by the display device is incident upon the user's eyes so that the user perceives a first perception picture. The first interactive mode is that the user approaches the first display region of the electronic apparatus. At this time, an adjustment parameter for instructing to adjust the display effect of the first perception picture is obtained; and thereby a control signal is generated. Then, the display parameter of the display device are adjusted based on the control signal, such that the display effect of the first perception picture currently perceived by the user is different from the display effect of the first perception picture perceived before the adjustment, so as to meet requirements of different users on the display effect of the first perception picture, and to avoid hurt to the user's eyes due to excessively strong display brightness of the first perception picture.

BRIEF DESCRIPTION OF THE DRAWINGS

In order to clearly illustrate the technical solutions in the embodiments of the present application or the prior art, the drawings required by the embodiments or the prior art will be briefly described as below; it is obvious that the drawings described below are only related to some embodiments of the present application, and those skilled in the art can obtain other drawings according to the provided drawings without any inventive effort.

DETAILED DESCRIPTION

Hereinafter, the technical solutions of the embodiments of the present application will be described in a clearly and fully understandable way in conjunction with the drawings related to the embodiments of the present application. It is obvious that the described embodiments are just part of rather than all of the embodiments of the present application. Based on the embodiments of the present application, those skilled in the art can obtain other embodiment(s), without any inventive work, which should be within the scope of the invention.

An embodiment of the present application provides a method for adjusting a display effect, for implementing adjustment of the display effect of an electronic apparatus, to meet requirements on comfort degree of the display effect by different users wearing the electronic apparatus, so as to avoid hurt to the users' eyes due to excessively strong display brightness.

Figure 1:
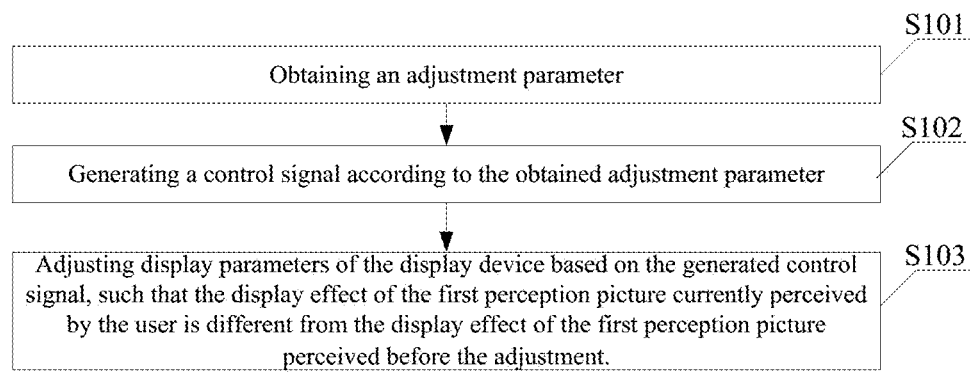
FIG. 1 is a schematic flow chart of a method for adjusting a display effect according to an embodiment of the present application.

FIG. 1 is a schematic flow chart of a method for adjusting a display effect according to an embodiment of the present application. The method is applied to an electronic apparatus. The electronic apparatus comprises a frame body, a fixing device and a functional main body section. The fixing device is connected to the frame body, and is used for fixing the electronic apparatus onto a support body. The functional main body section comprises a display device disposed in the frame body. The display device has a first display region. When a user views a first display content in the first display region in a first interactive mode, a light beam emitted by the display device is incident upon the user's eyes so that the user perceives a first perception picture. A size of the first perception picture is greater than that of the first display region. The first interactive mode is that the user approaches the first display region of the electronic apparatus. The electronic apparatus may be a watch or a pair of glasses, the method according to the embodiment of the present application may comprise steps of step S101 to S103 as below.

In step S101, an adjustment parameter is obtained.

The adjustment parameter is used for instructing to adjust the display effect of the first perception picture. The first perception picture is a picture presented in the user's brain by the user's eyes when the user is viewing the first display content displayed in the first display region of the display device of the electronic apparatus in the first interactive mode. Thus, the display effect of the first perception picture may include at least one of display brightness, a display color and a display size of the first perception picture, and may further include other display parameters of the first perception picture.

In the embodiment of the present application, the adjustment parameter may be an adjustment signal generated when the display parameter of the display device of the electronic apparatus are adjusted by the user directly according to actual feeling of the display effect of the first perception picture, after the user wears the electronic apparatus.

Figure 2:
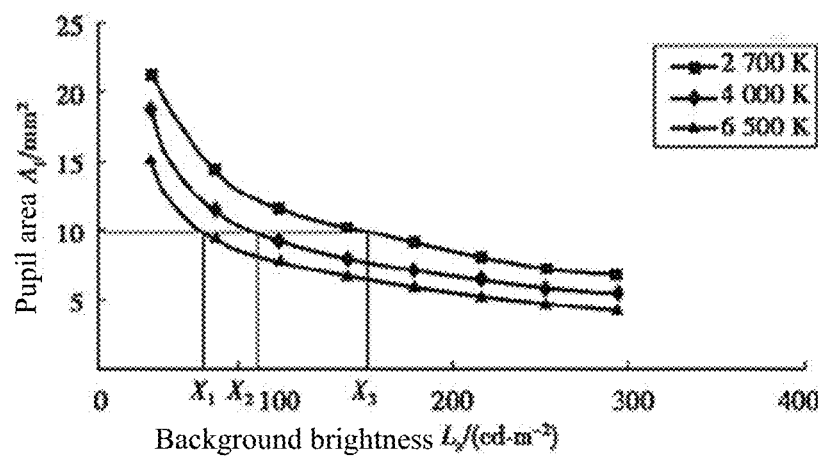
FIG. 2 is a relation curve of a user's pupil value and display brightness.

As another embodiment of the present application, when the display effect of the first perception picture is the display brightness, since the user's pupil value will follow a certain variation rule with stimuli by different display brightness, as shown in FIG. 2. The variation rule is specifically a negative exponential relationship between the user's pupil value and the display brightness, the user's pupil value (i.e., a theoretical pupil value) will decrease as the display brightness of the first perception picture increases, and the decrease speed will decrease as the display brightness increases; when a certain display brightness is reached, the pupil value gets gradually stabilized. Thus, in the embodiment of the present application, the relation curve can be divided into different sections according to a variation situation of the relation curve of FIG. 2, and a corresponding variation value of the display brightness is determined for every varied unit of the pupil value in each section.

In practical application of this embodiment, in order to avoid frequent adjustment of the display parameter of the display device of the electronic apparatus, when a difference value between the theoretical pupil value and the user's actual pupil value detected under a certain display effect is within a certain threshold range, the difference is considered to meet a predetermined condition. That is to say, the display effect is within a comfortable range of the display effect of the first perception picture perceived by the user. At this time, the display parameter of the display device of the electronic apparatus may not be adjusted. Of course, the display parameter of the display device may also be adjusted, so that the user's actual pupil value is restored to the theoretical pupil value, and current display parameter corresponding to the theoretical pupil value are recorded, as data of actual variation rule of the user's pupil value and the display effect, for direct call by the user.

The adjustment parameter obtained in step S101 may further be an adjustment value determined by adjusting the actual pupil value under the display effect according to the difference value and the predetermined condition, when the difference value between the theoretical pupil value and the user's actual pupil value detected under a certain display effect does not meet the above-described predetermined condition.

Specifically, when the difference value between the theoretical pupil value and the detected user's actual pupil value under a certain display effect is within a range of $0.05 \text{ mm}^2$, it is considered that the predetermined condition is met. For example, if the display effect is display brightness of $100 \text{ cd·m}^{-2}$, the corresponding theoretical pupil value is $A_{p1}=12 \text{ mm}^2$, and the user's actual pupil value detected is $A_{p2}=10 \text{ mm}^2$, then the difference value between the theoretical pupil value and the actual pupil value is $\Delta A_p = A_{p1} - A_{p2} = 2 \text{ mm}^2$; obviously, the difference value is greater than $0.05 \text{ mm}^2$, only if the user's actual pupil value is increased by $1.05 \text{ mm}^2$, can the difference value between the actual pupil value and the theoretical pupil value under the display brightness of $100 \text{ cd·m}^{-2}$ meet the predetermined condition. At this time, the adjustment parameter obtained in step S101 is the adjustment value of the actual pupil value of $1.95 \text{ mm}^2$.

As another embodiment of the present application, when the difference value between the theoretical pupil value and the detected user's actual pupil value under a certain display effect does not meet the above-described predetermined condition, a prompt message may be further output according to whether the difference value is greater than zero or not, to prompt the user to adjust the display parameter of the display device of the electronic apparatus, so as to obtain the adjustment parameter. At this time, the adjustment parameter is just the adjustment signal generated when the user adjusts the display parameter of the display device.

In step S102, a control signal is generated according to the adjustment parameter obtained.

When the adjustment parameter is the adjustment signal generated after the user adjusts the display parameter of the display device of the electronic apparatus, the control signal generated thereby may be high level signal or low level signal. Specifically, it may be determined whether the control signal is a high level signal or a low level signal according to content of the adjustment signal.

For example, when the adjustment parameter obtained is the adjustment signal generated when the user increases the display parameter of the display device, the control signal generated thereby is a high level signal; on the contrary, the control signal is a low level signal.

However, when the adjustment parameter is a first adjustment value of the actual pupil value under a certain display effect which is determined according to the first difference value between the theoretical pupil value and the actual pupil value under the certain display effect and the above-described predetermined condition, the step S102 may specifically include: obtaining a first variation amount of the display parameter of the display device corresponding to the first adjustment value; when the first difference value is greater than zero, generating the control signal for controlling the display parameter of the display device to be decreased by the first variation amount; and when the first difference value is less than zero, generating the control signal for controlling the display parameter of the display device to be increased by the first variation amount In step S103, the display parameter of the display device is adjusted based on the control signal, such that the display effect of the first perception picture currently perceived by the user is different from the display effect of the first perception picture perceived before the adjustment.

If the control signal is generated according to the adjustment signal generated when the user gradually adjusts the display parameter of the display device, then every time after the user adjusts the display parameter of the display device, the display effect of the first perception picture currently perceived will be different from the display effect of the first perception picture perceived before the adjustment. The user may continue to make adjustment and comparison until he/she perceives a comfortable display effect of the first perception picture. Thereafter, the current display parameter of the display device can be recorded, as the user's archive data.

When the control signal is a control signal generated according to the first adjustment value of the actual pupil value described above, the display effect of the first perception picture currently perceived by the user may be comfortable just by increasing or decreasing the display parameter of the display device by the first variation amount corresponding to the first adjustment value. At this time, the current display parameter of the display device and the corresponding actual pupil value are recorded, as the user's archive data. An adjustment direction is determined according to a magnitude relationship between the theoretical pupil value and the actual pupil value under the display effect.

Thus, in the embodiment of the present application, when the user views the first display content in the first display region of the display device of the electronic apparatus in the first interactive mode to perceive the first perception picture, the adjustment parameter for instructing to adjust the display effect of the first perception picture is obtained, and thereby the corresponding control signal is generated, the adjustment of the display parameter of the display device of the electronic apparatus is implemented, so that the display effect of the first perception picture currently perceived by the user is different from the display effect of the first perception picture perceived before the adjustment. Accordingly, the requirements of different users on comfort degree of the display effect of the first perception picture are satisfied, and hurt to the users' eyes due to excessively strong display brightness is avoided.

Figure 3:
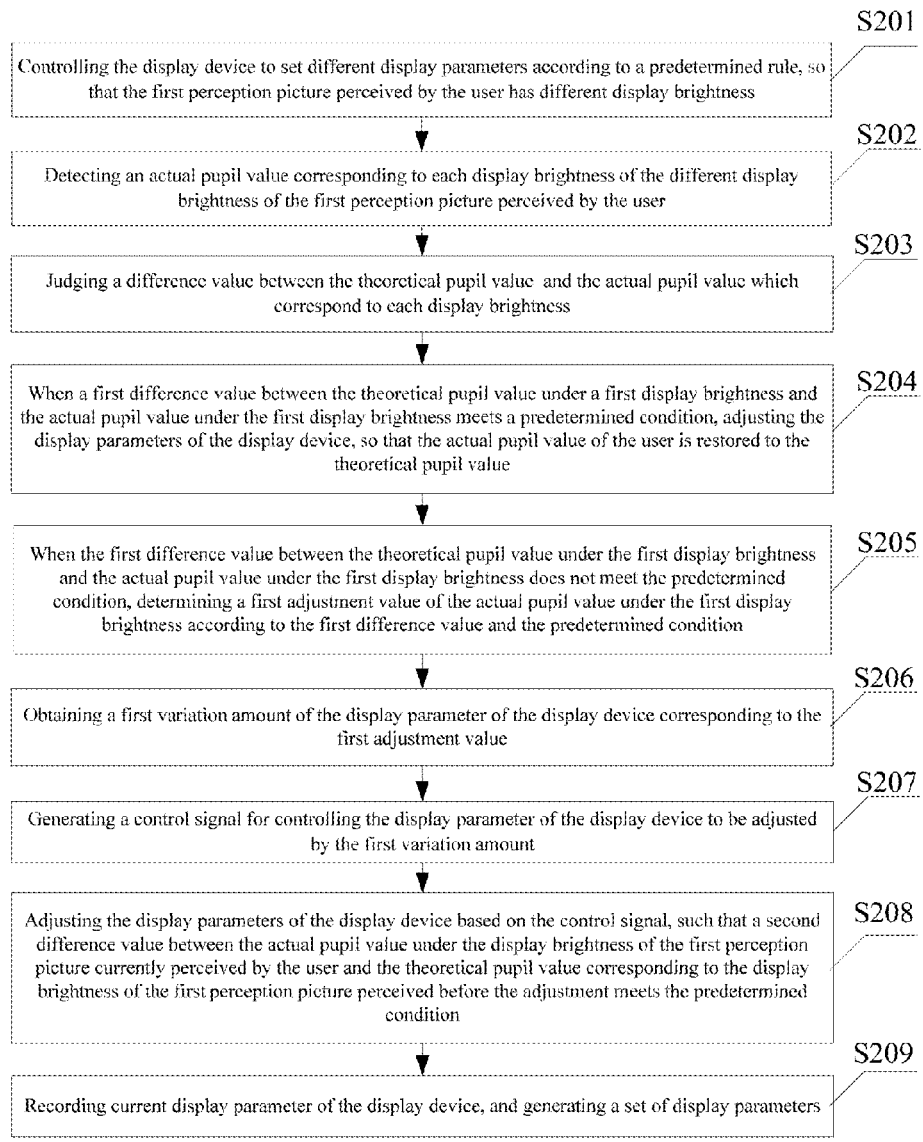
FIG. 3 is a schematic flow chart of another method for adjusting a display effect according to an embodiment of the present application.

FIG. 3 is a schematic flow chart of another method for adjusting a display effect according to an embodiment of the present application. The method is applied to an electronic apparatus. The electronic apparatus comprises a frame body, a fixing device and a functional main body section. The fixing device is connected to the frame body, and is used for fixing the electronic apparatus onto a support body. The functional main body section comprises a display device disposed in the frame body. The display device has a first display region. When a user views a first display content in the first display region in a first interactive mode, a light beam emitted by the display device is incident upon the user's eyes so that the user perceives a first perception picture. A size of the first perception picture is greater than that of the first display region. The first interactive mode is that the user approaches the first display region of the electronic apparatus. The electronic apparatus may be a watch or a pair of glasses, etc. When it is necessary to adjust the display brightness of the first perception picture perceived by the user, the method according to this embodiment may specifically comprise steps of S201-S209 as below.

In step S201, the display device is controlled to set different display parameters according to a predetermined rule, so that the first perception picture perceived by the user has different display brightness.

The different display parameters of the display device of the electronic apparatus correspond to the different display brightness one by one. The predetermined rule comprises different display parameters and theoretical pupil values which correspond to the different display parameters one by one. The corresponding relation between the different display parameters of the display device and the theoretical pupil values may be determined according to a curve of the variation rule as shown in FIG. 2, and will not described in detail in the present application.

In step S202, an actual pupil value corresponding to each display brightness of the different display brightness of the first perception picture perceived by the user is detected.

In practical application of this embodiment, the actual pupil value corresponding to each display brightness of the different display brightness of the first perception picture perceived by the user may be detected by a detecting device included in the functional main body section of the electronic apparatus. The detecting device may specifically be a camera or a camcorder When the electronic apparatus is a watch, the detecting device can be disposed near a dial or lugs of the watch, etc. When the user views the display content on the watch dial in the first interactive mode, the user's actual pupil value is detected. When the electronic apparatus is a pair of glasses, the detecting device can be disposed in positions of both spectacle lenses of the glasses, so that when the user views the display content on the screen of the glasses in the first interactive mode, the actual pupil value thereof is detected.

At this time, the actual variation rule between the user's actual pupil value and the display brightness may be established according to the actual pupil value corresponding to each detected display brightness for subsequent calls.

In step S203, a difference value between the theoretical pupil value and the actual pupil value under each display brightness is judged.

In step S204, when a first difference value between the theoretical pupil value under a first display brightness and the actual pupil value under the first display brightness meets a predetermined condition, the display parameter of the display device is adjusted, so that the actual pupil value of the user is restored to the theoretical pupil value.

It is still illustrated with the first display brightness of 100 cd·m$^{-2}$ as an example, if the theoretical pupil value under the first display brightness at this time is $A_{p3}=12$ mm$^2$, the actual pupil value is $\Delta A_{p4}=11.97$ mm$^2$, the first difference value between the theoretical pupil value and the actual pupil value is $\Delta A_p = A_{p3} - A_{p4} = 0.03$ mm$^2$, which is less than 0.05 mm$^2$. That is to say, the first difference value meets the predetermined condition, which means that the current display brightness is within a required comfort range of the display brightness of the first perception picture perceived by the user.

At this time, the user's actual pupil value may be restored to the theoretical pupil value by adjusting the display parameter of the display device, and the corresponding actual display brightness when the user's pupil value is the theoretical pupil value such as 12 mm$^2$ and the current display parameter of the display device are recorded, so as to obtain the actual variation rule of the pupil value and the display brightness that meet the requirements of the user on a comfort degree of the display brightness. Of course, in order to decrease frequent adjustments to the display parameter of the display device, at this time, the user's actual pupil value under the first display brightness may be recorded directly, so as to obtain the actual variation rule of the pupil value and the display brightness that meet the requirements of the user on the comfort degree of the display brightness.

In step S205, when the first difference value between the theoretical pupil value under the first display brightness and the actual pupil value under the first display brightness does not meet the predetermined condition, a first adjustment value of the actual pupil value under the first display brightness is determined according to the first difference value and the predetermined condition.

It is still illustrated with the first display brightness of 100 cd·m$^{-2}$ as an example, if the corresponding theoretical pupil value is $A_{p1}=12$ mm$^2$, the user's actual pupil value detected is $A_{p2}=10$ mm$^2$, then the first difference value between the theoretical pupil value and the actual pupil value is $\Delta A_p = A_{p1} - A_{p2} = 2$ mm$^2$, when the predetermined condition is that the first difference value is no greater than 0.05 mm$^2$, the first adjustment value is just $2-0.05=1.95$ mm$^2$.

In step S206: a first variation amount of the display parameter of the display device corresponding to the first adjustment value is obtained.

In the embodiment of the present application, the relation curve can be divided into different sections according to a variation situation of the relation curve shown in FIG. 2, and a corresponding variation value of the display brightness is determined for every varied unit of the pupil value in each section, to further determine the variation amount of the display parameter of the display device. Thus, when the first adjustment value of the user's actual pupil value is obtained, the section where it is located will be determined according to the theoretical pupil value under the display brightness; and thereafter, a first variation value of the display brightness corresponding to the first adjustment value can be determined by just multiplying the first adjustment value with the variation value of the display brightness corresponding to every varied unit of the pupil value in the section, to further determine the first variation value of the display parameter of the display device.

In step S207, a control signal for controlling the display parameter of the display device to be adjusted by the first variation amount is generated.

Specifically, when the first difference value between the theoretical pupil value and the actual pupil value under the first display brightness is greater than zero, a control signal for controlling the display parameter of the display device to be decreased by the first variation amount is generated; when the first difference value is less than zero, a control signal for controlling the display parameter of the display device to be increased by the first variation amount is generated.

In step S208, the display parameter of the display device is adjusted based on the control signal, so that a second difference value between the actual pupil value under the display brightness of the first perception picture currently perceived by the user and the theoretical pupil value corresponding to the display brightness of the first perception picture perceived before the adjustment meets the predetermined condition.

Specifically, it is still illustrated with the first display brightness of 100 cd·m$^{-2}$ as an example, after the display parameter of the display device are adjusted by the first variation amount based on the control signal, the actual pupil value under the display brightness of the first perception picture currently perceived by the user will vary from 10 mm$^2$ to 11.95 mm$^2$. At this time, the display brightness of the first perception picture currently perceived by the user is 80 cd·m$^{-2}$, and the user's actual pupil value of 11.95 mm$^2$, the corresponding display brightness of 80 cd·m$^{-2}$ and the current display parameter of the display device corresponding to the display brightness are recorded.

In step S209: the current display parameter of the display device is recorded, and a set of display parameters is generated.

In practical application of this embodiment, after the adjustment of the display effect of the first perception picture perceived by the user is completed, the finally obtained corresponding display parameter of the display device that make the user feel comfortable are recorded and stored, so that the user can directly call them when wearing the electronic apparatus again. Thus, not only requirements of the user on comfort degree of the display brightness of the first perception picture are met, but also hurt to the user's eyes due to excessively strong display brightness is avoided.

Based on the above-described analysis, when it is necessary to adjust the display brightness of the first perception picture perceived by the user, in the embodiment of the present application, the actual pupil value corresponding to each display brightness of different display brightness of the first perception picture perceived by the user is detected, when the difference value between the theoretical pupil value and the actual pupil value which correspond to a certain display brightness does not meet the predetermined condition, the first adjustment value for the actual pupil value under the display brightness is determined by using the difference value and the predetermined condition, so as to obtain the first variation amount of the display parameter of the display device corresponding to the first adjustment value, and to implement the adjustment of the display parameter of the display device, so that the second difference value between the actual pupil value under the display brightness of the first perception picture currently perceived by the user and the theoretical pupil value corresponding to the display brightness of the first perception picture perceived before the adjustment meets the predetermined condition. Thus, requirements of the user on comfort degree of the display brightness of the first perception picture are met, and hurt to the user's eyes due to excessively strong display brightness is avoided.

Figure 4:
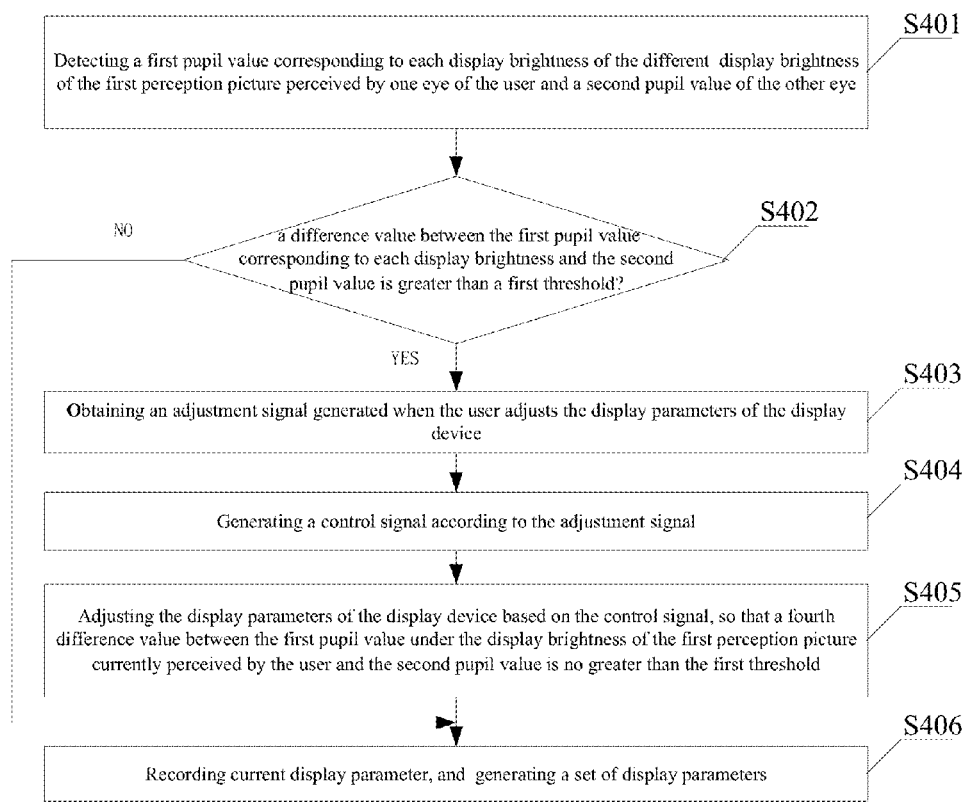
FIG. 4 is a schematic flow chart of still another method for adjusting a display effect according to an embodiment of the present application.

Another method for adjusting a display effect according to an embodiment of the present application is shown in the schematic flow of in FIG. 4. The method according to the embodiment is applied to an electronic apparatus. The composition and connection structures of the electronic apparatus are identical with those of the electronic apparatus in the above-described embodiments, which will not be described here in the present application. When the first perception picture perceived by the user is perceived by one eye of the user, the method according to this embodiment may comprise steps of S401-S 406 as below.

In step S401, a first pupil value corresponding to each display brightness of the different display brightness of the first perception picture perceived by one eye of the user and a second pupil value of the other eye are detected.

In this embodiment, the user views a first display content in the first display region of the display device with only one eye, and perceives the first perception picture, while the other eye is viewing external environment. Because light intensity of the first display region is different from ambient light intensity, the pupil values of the user's two eyes are different. In order to avoid excessively great difference value between the first pupil value and the second pupil value which affects a viewing effect and a comfort degree of the user, the embodiment of the present application adjusts the display parameter of the display device specifically in the mode described as follows, to vary the current display brightness of the first perception picture.

In step S402: judging whether the difference value between the first pupil value corresponding to each display brightness and the second pupil value is greater than a first threshold. If yes, step S403 is executed. If no, the process directly proceeds to step S406.

The first threshold can be set by research on the electronic apparatus. For most users, when the difference value between the first pupil value and the second pupil value thereof is within a range of the first threshold, they feel comfortable. At this time, it is not necessary to adjust the display parameter of the display device, as long as the current display parameter are recorded, and a set of display parameter generated are used as service date of the electronic apparatus of the user, for later call.

In step S403: an adjustment signal generated when the user adjusts the display parameter of the display device is generated.

Specifically, when the third difference value is greater than zero, a first prompt message is output, to obtain an adjustment signal generated when the user increases the display parameter of the display device; and when the third difference value is less than zero, a second prompt message is output, to obtain an adjustment signal generated when the user decreases the display parameter of the display device.

In step S404: a control signal is generated according to the adjustment signal. Different control signals are generated according to specific functions of the adjustment signal (i.e., increasing or decreasing the display parameter of the display device).

In step S405: the display parameter of the display device is adjusted based on the control signal, such that a fourth difference value between the first pupil value under the display brightness of the first perception picture currently perceived by the user and the second pupil value is no greater than the first threshold.

In step S406: the current display parameter is recorded, to generate a set of display parameters.

Since intensities of light incident upon the user's two eyes are different, the pupil values of the user's twos eyes are different. In the embodiment of the present application, with the second pupil value of one eye viewing the ambient light as a reference, the display parameter of the display device are adjusted, so that the difference value between the first pupil value of one eye of the user which perceives the first perception picture and the second pupil value is no greater than the first threshold, in order that the requirements of the user on comfort degree of the display brightness of the first perception picture are met.

As another embodiment of the present application, since requirements on a display color of the first perception picture perceived by different users are different, e.g., resolution and saturation of the color, etc., the present application also provides another method for adjusting a display effect, i.e., a method for adjusting a display color. The method is applied to an electronic apparatus. The composition and structure of the electronic apparatus are identical with those of the electronic apparatus in the above-described embodiments, which will not be described here in the present application, and the method may specifically comprise steps as below.

An adjustment signal when the display parameter of the display device are adjusted is obtained according to actual feeling of the display color of the first perception picture perceived by the user per se, the functional main body section of the electronic apparatus generates a corresponding control signal according to the adjustment information, so as to implement adjustment of the display parameter of the display device, such that the display color of the first perception picture currently perceived by the user is different from the display color of the first perception picture perceived before the adjustment. The adjustment and the comparison are thus performed repeatedly, until the user is satisfied with the display color of the first perception picture perceived thereby, so as to further enhance the user's feeling. Thereafter, the finally adjusted display parameter of the display device may be stored, so that the user can directly call them when wearing the electronic apparatus again.

Figure 5:
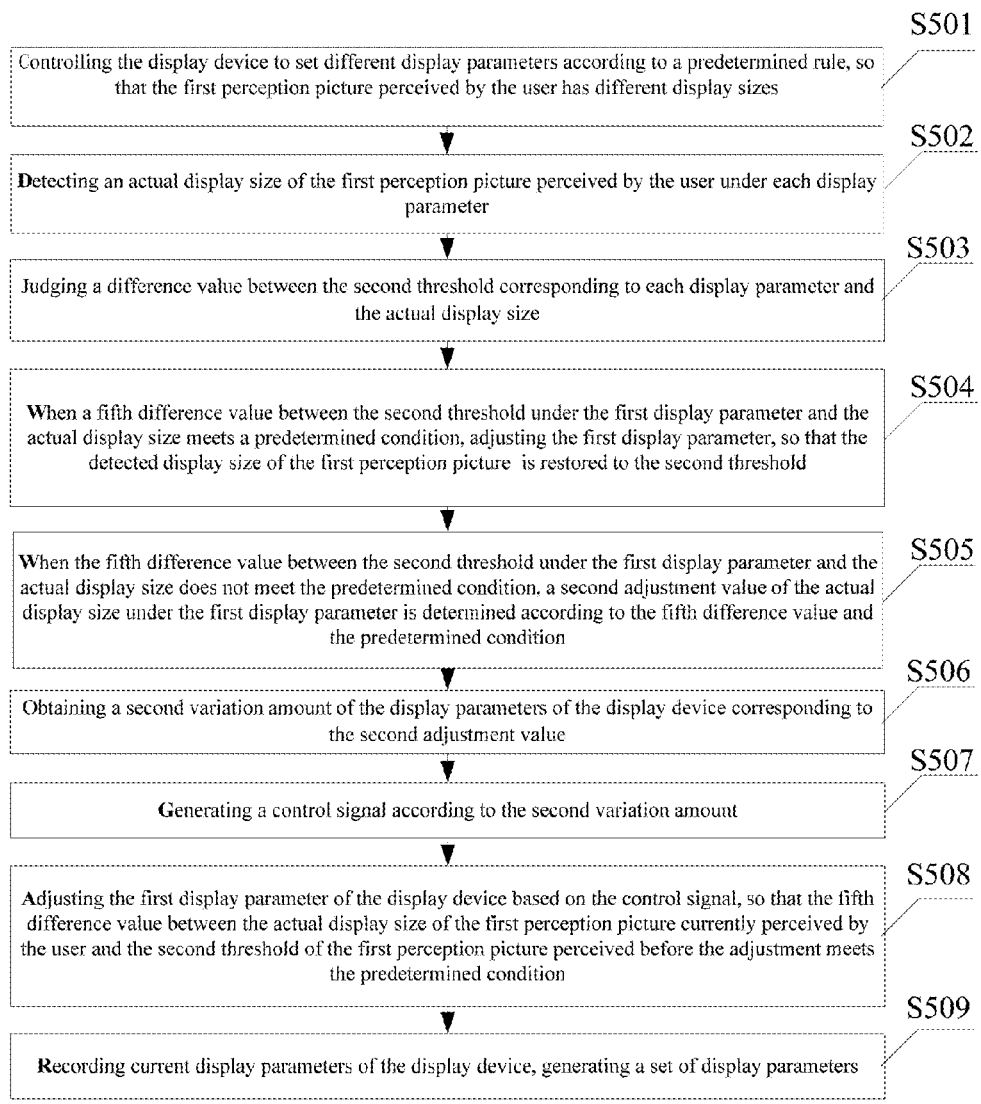
FIG. 5 is a schematic flow chart of a further method for adjusting a display effect according to an embodiment of the present application.

As still another embodiment of the present application, since requirements on a size of the first perception picture perceived by different users are different, the present application further provides a method for adjusting a display effect. In the method for adjusting the display effect, a distance for the user to view the first display content in the first display region of the display device may be adjusted by adjusting the display parameter of the display device, so as to vary the display size of the first perception picture perceived by the user. Specifically, in the schematic flow as shown in FIG. 5, the method may comprise steps of S501-S509.

In step S501, the display device is controlled to set different display parameters according to a predetermined rule, so that the first perception picture perceived by the user has different display sizes.

The different display parameters correspond to the different display effects one by one. The predetermined rule comprises the different display parameters and a second threshold of the display size of the first perception picture required by the user, which correspond to the different display parameters one by one.

In step S502, an actual display size of the first perception picture perceived by the user under each display parameter is detected.

In step S503, a difference value between the second threshold corresponding to each display parameter and the actual display size is judged.

In step S504, when a fifth difference value between the second threshold under a first display parameter and the actual display size meets a predetermined condition, the first display parameter is adjusted, so that the detected actual display size of the first perception picture is restored to the second threshold.

The predetermined condition may refer to an allowable value of the difference value between the second threshold under a certain display parameter and the actual display size required by the user. Thus, when the fifth difference value is within a range of the allowable value, the first display parameter may be adjusted, so that the detected actual display size of the first perception picture is restored to the second threshold. Of course, in order to reduce a number of times for adjusting the display parameter of the display device, the first display parameter may not be adjusted.

In step S505, when the fifth difference value between the second threshold under the first display parameter and the actual display size does not meet the predetermined condition, a second adjustment value of the actual display size under the first display parameter is determined according to the fifth difference value and the predetermined condition.

The second adjustment value is actually a difference value between the adjustment value and the allowable value corresponding to the first display parameter.

In step S506, a second variation amount of the display parameter of the display device corresponding to the second adjustment value is obtained.

In step S507, a control signal is generated according to the second variation amount.

In the embodiment of the present application, when the fifth difference value is greater than zero, it is necessary to increase the display size of the first perception picture perceived by the user. At this time, if the display parameter of the display device are increased such that the display size of the first perception picture perceived by the user increases, a control signal for controlling the display parameter of the display device to be increased by the second variation amount is generated according to the second variation amount; on the contrary, a control signal for controlling the display parameter of the display device to be decreased by the second variation amount is generated.

In step S508: the first display parameter of the display device is adjusted based on the control signal, so that the fifth difference value between the actual display size of the first perception picture currently perceived by the user and the second threshold of the first perception picture perceived before the adjustment meets the predetermined condition.

In step S509, the current display parameter of the display device is generated to generate a set of display parameters.

Thus, the embodiment of the present application meets requirements of different users on comfort degree of the first perception picture by adjusting the actual display size of the first perception picture perceived by the user. Of course, in addition to the adjusting method provided by steps S501~S509 as described above, the display parameter of the display device may be adjusted directly according to the actual display size of the first perception picture perceived by the user. When the user is satisfied with the display size of the first perception picture under a certain parameter, the adjustment is stopped and the current display parameter of the display device is recorded.

Figure 6:
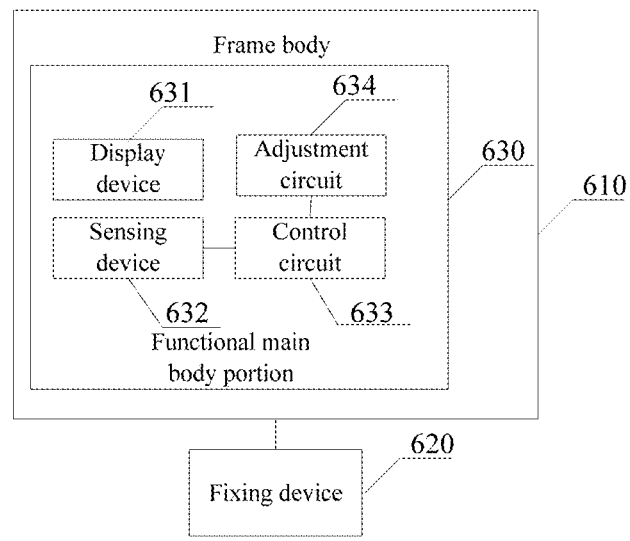
FIG. 6 is a structural schematic diagram of an electronic apparatus according to an embodiment of the present application.

For a method for adjusting a display effect provided by the above-described respective embodiments of the present application, the present application further provides an electronic apparatus for implementing the method, in the structural schematic diagram of the electronic apparatus as shown in FIG. 6, the electronic apparatus may comprise: a frame body 610, a fixing device 620 and a functional main body section 630.

The fixing device 620 is connected to the frame body 610, and the fixing device 620 is used for fixing the electronic apparatus onto a support body.

In practical application, when the electronic apparatus is a watch or a wristband, the support body is a user's arm. When the electronic apparatus is fixed onto the user's arm by the fixing device 620, the frame body 610 and the fixing device 620 constitute an annular space. When the electronic apparatus is a pair of glasses, the support body is the user's head.

The functional main body section 630 comprises a display device 631 disposed in the frame body 610. Specifically, when the electronic apparatus is a watch or a wristband, etc., the display device 631 is disposed within the frame body 610; when the electronic apparatus is a pair of glasses, the display device 631 is disposed on the frame body 610.

The display device 631 has a first display region. When a user views a first display content in the first display region in a first interactive mode, a light beam emitted by the display device 631 is incident upon the user's eyes so that the user perceives a first perception picture. A size of the first perception picture is greater than that of the first display region. The first interactive mode is that the user approaches the first display region of the electronic apparatus.

In the embodiment of the present application, the functional main body section 630 may further include a sensing device 632, a control circuit 633, or an adjustment circuit 634.

The sensing device 632 is used for obtaining an adjustment parameter. The adjustment parameter is used for instructing to adjust a display effect of the first perception picture (e.g., display brightness, a display color and/or a display size, etc.), and specifically may be an adjustment signal generated according to an operation by the user, or first adjustment value of the actual pupil value under first perception picture currently perceived by the user.

The control circuit 633 is used for generating a control signal according to the adjustment parameter of the sensing device 632.

The adjustment circuit 634 is used for adjusting display parameter of the display device 631 based on the control signal, such that the display effect of the first perception picture perceived by the user is different from the display effect of the first perception picture perceived before the adjustment.

In the embodiment of the present application, when the user views a first display content in the first display region of the display device of the electronic apparatus in the first interactive mode, to perceive the first perception picture, the adjustment parameter for instructing to adjust the display effect of the first perception picture is obtained by the sensing device, and thereby the control signal is generated by the control circuit, so as to enable the adjustment circuit to implement adjustment of the display parameter of the display device of the electronic apparatus, such that the display effect of the first perception picture currently perceived by the user is different from the display effect of the first perception picture perceived before the adjustment. Thus, requirements of different users on comfort degree of the display effect of eye first perception picture are met, and hurt to the users' eyes due to excessively strong display brightness of the first perception picture is avoided.

Figure 7:
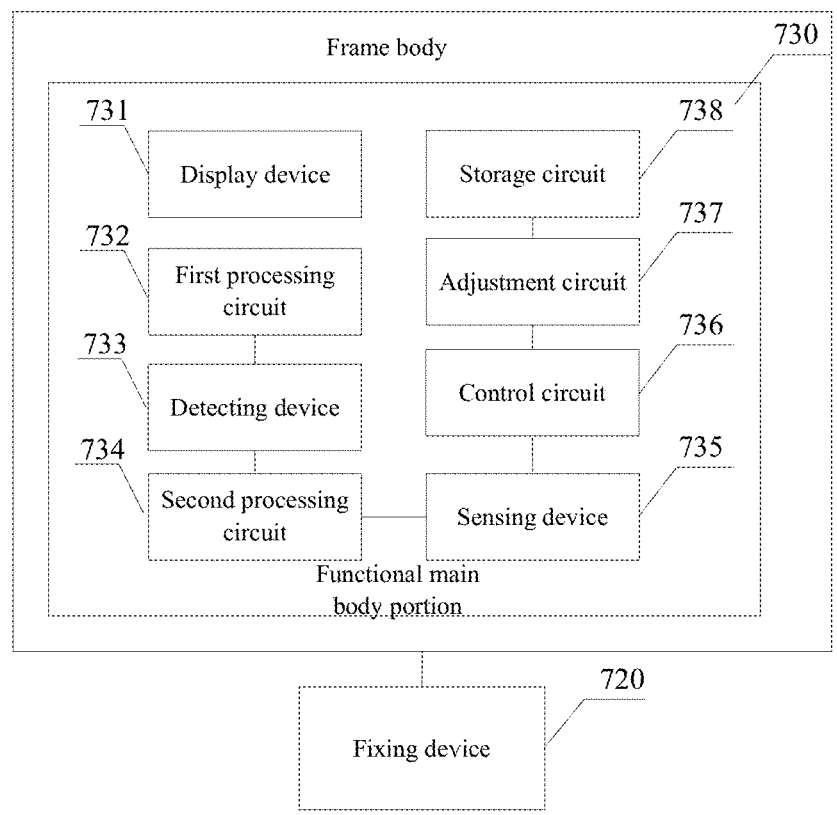
FIG. 7 is a structural schematic diagram of another electronic apparatus according to an embodiment of the present application.

As shown in FIG. 7, in order to implement another method for adjusting a display effect in the present application, i.e., to implement a method for adjusting display brightness, the present application provides a structural schematic diagram of another electronic apparatus, the electronic apparatus may comprise: a frame body 710, a fixing device 720 and a functional main body section 730.

The fixing device 720 is connected to the frame body 710, and the fixing device 720 is used for fixing the electronic apparatus onto a support body.

The functional main body section 730 comprises a display device 731 disposed in the frame body 710. Specifically, when the electronic apparatus is a watch or a wristband, etc., the display device 731 is disposed within the frame body 710; when the electronic apparatus is a pair of glasses, the display device 731 is disposed on the frame body 710.

In this embodiment, the display device 731 has a first display region. When a user views a first display content in the first display region in a first interactive mode, a light beam emitted by the display device 731 is incident upon the user's eyes so that the user perceives a first perception picture. A size of the first perception picture is greater than that of the first display region, and the first interactive mode is that the user approaches the first display region of the electronic apparatus.

The functional main body section 730 may further include other components, described in detail as below.

The functional main body section 730 may further include a first processing circuit 732 for controlling the display device 731 to set different display parameters according to a predetermined rule, so that the first perception picture perceived by the user has different display effects.

In this embodiment, the different display parameters correspond to the different display effects one by one; the predetermined rule comprises different display parameters and theoretical pupil values which correspond to the different display parameters one by one.

The functional main body section 730 may further include a detecting device 733, for detecting an actual pupil value corresponding to each display effect of the different display effects of the first perception picture perceived by the user.

The detecting device 733 may specifically be a camcorder or a camera. When the electronic apparatus is a watch, the detecting device can be disposed near a dial or lugs of the watch, etc. When the electronic apparatus is a pair of glasses, the detecting device can be disposed in both spectacle lenses of the glasses.

The functional main body section 730 may further include a second processing circuit 734, for judging a difference value between the theoretical pupil value and the actual pupil value under each display effect. When a first difference value between the theoretical pupil value and the actual pupil value under a first display effect meets a predetermined condition, the display parameter of the display device 731 are adjusted, so that the actual pupil value of the user is restored to the theoretical pupil value.

The functional main body section 730 may further include a sensing device 735. When the first difference value between the theoretical pupil value under a first display brightness and the actual pupil value under the first display brightness does not meet the predetermined condition, the sensing device 735 determines a first adjustment value of the actual pupil value under the first display brightness according to the first difference value and the predetermined condition.

The functional main body section 730 may further include a control circuit 736, which is used for obtaining a first variation amount of the display parameter of the display device corresponding to the first adjustment value, and generating the control signal for controlling the display parameter of the display device to be adjusted by the first variation amount.

Specifically, when the first difference value is greater than zero, a control signal for controlling the display parameter of the display device to be decreased by the first variation amount is generated; and when the first difference value is less than zero, a control signal for controlling the display parameter of the display device to be increased by the first variation amount is generated.

The functional main body section 730 may further include an adjustment circuit 737. The adjustment circuit 737 adjusts the display parameter of the display device 731 based on the control signal, so that a second difference value between the actual pupil value under the display brightness of the first perception picture currently perceived by the user and the theoretical pupil value corresponding to the display brightness of the first perception picture perceived before the adjustment meets the predetermined condition.

The functional main body section 730 may further include a storage circuit 738, which is used for recording current display parameter to generate a set of display parameters.

Optionally, in the respective embodiments described above, the functional main body section may further include an adjusting device disposed in the frame body. The adjusting device is used for adjusting the display parameter of the display device, to generate a corresponding adjustment signal, so that the sensing device sends the adjustment signal to the control circuit, to generate a control signal, and the adjustment circuit adjusts the display parameter of the display device according to the control signal, so as to meet requirements on comfort degree of the display effect of the first perception picture perceived by different users.

Optionally, when the first perception picture is perceived by one eye of the user, the detecting device 733 may further be used for detecting a first pupil value corresponding to each display effect of the different display effects of the first perception picture perceived by one eye of the user and a second pupil value of the other eye; the second processing circuit judges a difference value between the first pupil value corresponding to each display effect and the second pupil value. When a third difference value between the first pupil value under the first display effect and the second pupil value is no greater than a first threshold, the above-described storage circuit records the current display parameter, to generate a set of display parameters, so that the user can directly call them when wearing the electronic apparatus again.

When the third difference value between the first pupil value under the first display effect and the second pupil value is greater than the first threshold, the above-described sensing device is further used for: when the third difference value is greater than zero, obtaining an adjustment signal generated when the user increases the display parameter of the display device; and when the third difference value is less than zero, obtaining an adjustment signal generated when the user decreases the display parameter of the display device. The adjustment circuit is used for adjusting the display parameter of the display device based on the control signal generated by the control circuit, so that a fourth difference value between the first pupil value under the display effect of the first perception picture currently perceived by the user and the second pupil value is no greater than the first threshold, so as to meet requirements on comfort degree of the display effect of the first perception picture perceived by different users.

Figure 8A:
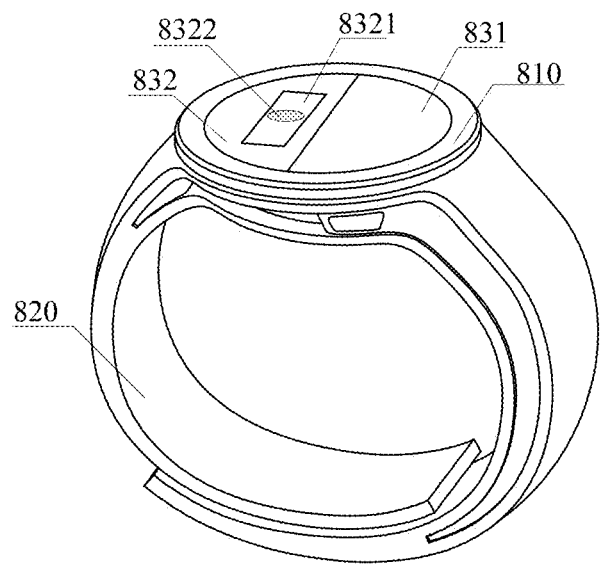
FIG. 8(a) is a composition structural schematic diagram of still another electronic apparatus according to an embodiment of the present application.

In order to more clearly illustrate the adjustment of the above-described display effects by the electronic apparatus, FIG. 8(a) shows a composition structural schematic diagram of an electronic apparatus. The electronic apparatus comprises: a frame body 810, a fixing device 820 and a functional main body section 830 (not shown in the diagram). The frame body 810 is connected to the fixing device 820. The fixing device 820 is used for fixing the electronic apparatus onto a support body. It is illustrated in detail in the present application with a Smartwatch as an example.

In this embodiment, the fixing device 820 is specifically a watchband; the functional main body section 830 is located within the frame body 810, and the functional main body section 830 comprises a display screen 831 and a display module 832. The display module 832 comprises a display imaging unit, and the display module 832 and the display screen 831 follow different display theories.

An upper end face of the frame body 810 of the Smartwatch may be made of a transparent material. The display screen 831 is set below a transparent lower end face, and corresponds to a first display output region 8311 (not shown in the diagram) on the upper end face, and the display module 832 corresponds to a second display output region 8321 on the upper end face. In the embodiment of the present application, a first size of the display screen 831 is consistent with a size of the first display output region 8311, while a second size of the display module 832 is smaller than a size of the second display output region 8321.

Figure 8B:
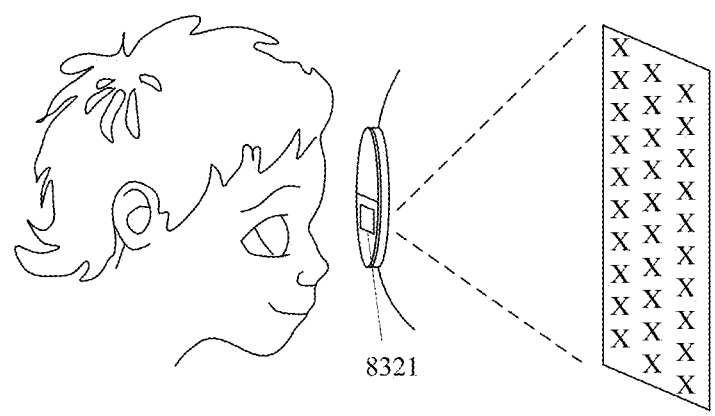
FIG. 8(b) is a schematic diagram of a user using the electronic apparatus in the still another electronic apparatus according to the embodiment of the present application.

In practical application, when there is a first distance value between the user and the electronic apparatus, a size of the display content on the display screen 831 perceived by the user is consistent with a size of the first display output region 8311, and a size of the display content on the display module 832 perceived by the user is greater than the size of the second display output region 8321. Specifically, as shown in FIG. 8(b), when the user approaches the electronic apparatus, he/she can see an enriched content by a light spot 8322 of the second display output region 8321, and the content observed by the user far exceeds the content that a physical size of the second display output region 8321 can carry. The light spot 8322 in the second display output region 8321 may display an output effect for the display module 832.

Figure 9A:
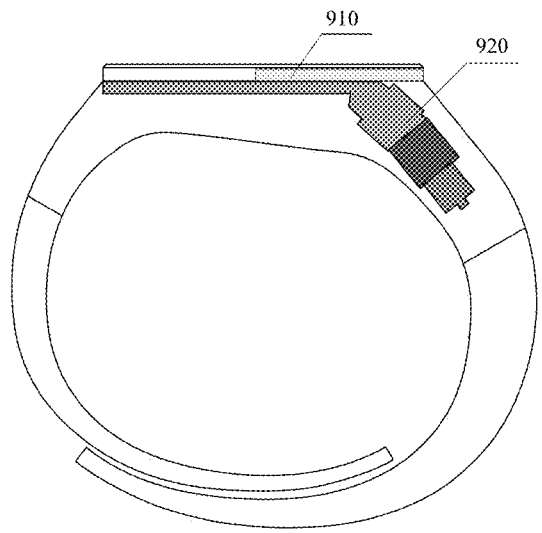
FIG. 9(a) is a composition structural schematic diagram of a further electronic apparatus according to an embodiment of the present application.
Figure 9B:
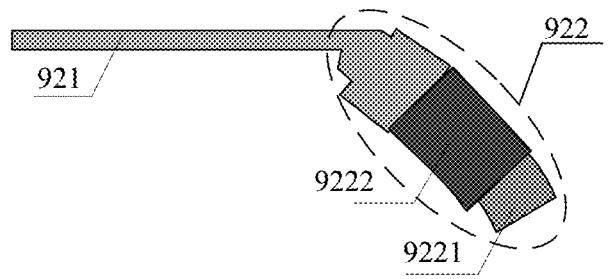
FIG. 9(b) is a partial composition structural schematic diagram of the further electronic apparatus according to the embodiment of the present application.

Optionally, the electronic apparatus provided by the present application may have a first display module and a second display module, and the composition structure of the electronic apparatus will be illustrated in detail still with the electronic apparatus being the Smartwatch as an example, see the specific composition structural diagram of the electronic apparatus as shown in FIGS. 9(a) and 9(b).

A first display module 910 of the electronic apparatus is a first display screen, for displaying and outputting a second display content. A physical size of the first display screen is consistent with a size of the first display output region of the first display module. A second display module 920 of the electronic apparatus is an optical projection system. As shown in FIG. 9(b), the second display module 920 comprises a first portion 921 and a second portion 922. The first portion 921 is a light transmission component. The second portion 922 comprises a display component 9221 and a collimating component 9222.

In practical application of the embodiment of the present application, the display component 9221 is used for displaying and outputting a second to-be-displayed content, projecting a first light beam in a beam mode, and outputting it to the collimating component 9222. The collimating component 9222 is used for processing the first light beam projected and outputted in a beam mode, converting it into a second light beam and outputting the second light beam to the light transmission component 921. The light transmission component 921 may also be referred to as a light-path conversion component, which may be made of a transparent material, for transmitting the second light beam in the transparent material, and finally outputting it to an observer.

The light transmission component 921 may include a reflecting unit. The reflecting unit is disposed in a specific region of an excess portion, for changing a transmission direction of the second light beam in the transparent material, and projecting the second light beam in a second direction. The second direction is consistent with an outputting direction of a first to-be-displayed content of the first display screen of the first display module 910. The specific region of the excess portion where the reflecting unit is disposed may specifically be a second display output region of the second display module 920.

Figure 9C:
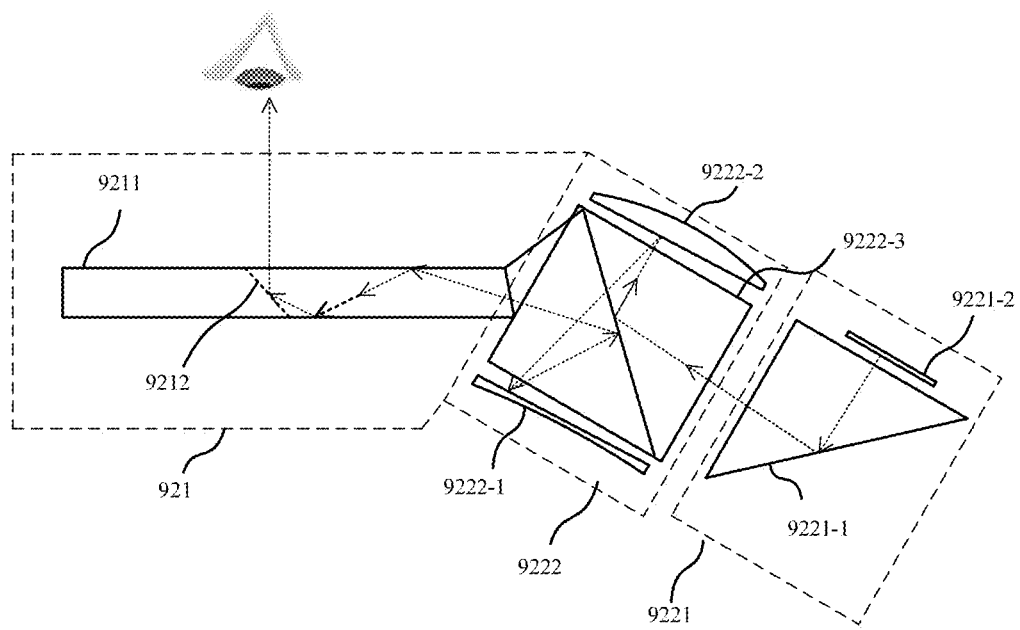
FIG. 9(c) is another composition structural schematic diagram of the further electronic apparatus according to another embodiment of the present application.
Figure 9D:
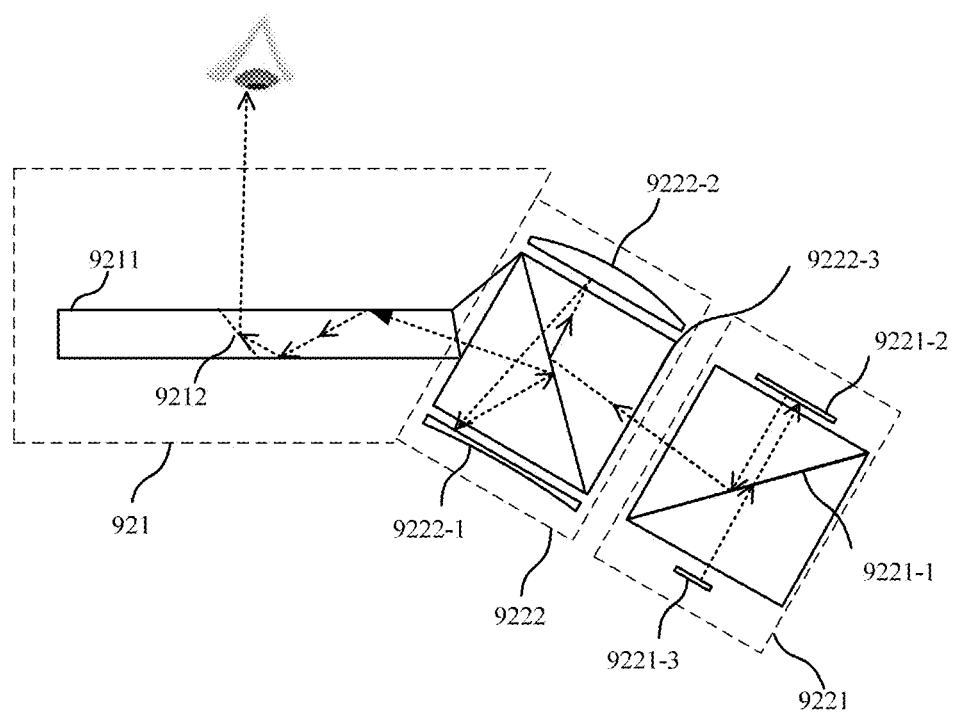
FIG. 9(d) is still another composition structural schematic diagram of the further electronic apparatus according to still another embodiment of the present application.

In the embodiment of the present application, the composition structure of the above-described second display module 920 may be the structural schematic diagram as shown in FIGS. 9(c) and 9(d). The display component 9221 of the second portion 922 in the second display module 920 comprises a splitting unit 9221-1 and a display unit 9221-2; the collimating component 9222 of the second portion 922 in the second display module 920 comprises a second collimating unit 9222-1, a first collimating unit 9222-2 and a polarization splitting unit 9222-3. Optionally, as shown in FIG. 9(d), the display component 9221 may further include a transmission unit 9221-3. In practical application, the collimating component 9222 processes the first light beam projected and outputted in a beam mode, converts it into a second light beam and outputs the second light beam to the light transmission component 921.

Specifically, the second collimating unit 9222-1 and the first collimating unit 9222-2 are arranged opposite to each other, and the polarization splitting unit 9222-3 is arranged between the second collimating unit 9222-1 and the first collimating unit 9222-2. In practical application, the first light beam outputted from the display component 9221 is reflected to the first collimating unit 9222-2 via the polarization splitting unit 9222-3, and after collimated by the first collimating unit 9222-2 and the second collimating unit 9222-1, the second light beam is emitted via the polarization splitting unit 9222-3.

The second collimating unit 9222-1 and the first collimating unit 9222-2 may be single lenses or lens groups designed according to needs.

In the embodiment of the present application, the light transmission component 921 in the second display module 920 comprises a waveguide unit 9211 and a reflecting unit 9212. In practical application, the second light beam may be controlled by setting a position and an angle of the reflecting unit 9212, which is guided in a specific position for its emission. In a first case, when the collimating component 9222 and the display component 9221 are located on a first side with respect to a plane where the waveguide unit 9211 is located, when the reflecting unit 9212 is set as shown in FIG. 9(c) and FIG. 9(d), the second light beam may be emitted toward a second side with respect to the plane where the waveguide unit 9211 is located. The first side and the second side are opposite sides with respect to the plane where the waveguide unit 9211 is located.

In practical application, when the above-described second display module 920 is applied to, e.g., the Smartwatch, the above example of configuration may be adopted, so that the second light beam is emitted toward the second side, that is, the second light beam is emitted toward the eyes of the user who wears and views the wrist-worn electronic apparatus.

Further, an emitting direction of the second display module 920 may be configured according to needs of viewing. For example, rotation of the reflecting unit 9212 may be controlled, so as to control the emitting direction of the reflecting unit 9212, to implement switching of bi-directional display of the second display module 920. In general, the observer (i.e., the user) sees that a physical size of the reflecting unit 9212 is no less than the size of the second display output region, and a size of the display unit 9221 in the second display module 920 is less than the size of the second display output region.

The reflecting unit 9212 may be a single prism or a prism group designed according to needs.

In addition, it should be illustrated that FIG. 9(c) and FIG. 9(d) are only intended to help those skilled in the art to understand technical solutions of the present application, which are not states of the electronic apparatus provided by the embodiment of the present application in use. For example, when used, the electronic apparatus is fixed onto a support body. When the support body is a wrist, the user lifts his/her arm to place the electronic apparatus in front of his/her eyes. It can be seen that, when using it, the user can view information provided by the electronic apparatus in a front angle.

Respective embodiments in the present specification are described in a progressive manner, each embodiment emphatically illustrates its differences from other embodiments, and the respective embodiments may be mutually referred to for identical or similar parts. For the electronic apparatus disclosed by the embodiments, since it is used for implementing the method disclosed by the embodiments, it is just briefly described, and for relevant descriptions, the illustration for the method may be referred to.

The above illustration of the disclosed embodiments enables those skilled in the art to implement or use the present application. Various modifications to these embodiments are obvious to those skilled in the art, and general principles defined in the text may be implemented in other embodiments without departing from the spirit or scope of the present application. Thus, the present application will not be limited to these embodiments shown in the text, but will conform to the broadest scope which is consistent with the principles and novel features disclosed by the text.

The invention claimed is:

1. A method for adjusting a display effect for a display device, the method comprising:
    allowing the display device to emit a light beam to be incident upon an eye of a user so that the user perceives a first perception picture upon the user viewing a first display content in a first display region of the display device in a first interactive mode, wherein a size of the first perception picture is greater than that of the first display region, and the first interactive mode is that the user approaches the first display region of the display device;
    detecting an actual pupil value of the user by the light beam emitted by the display device incident upon the eye of the user in perceiving the first perception picture;
    obtaining a current display effect of the display device and a theoretical pupil value corresponding to the current display effect;
    judging a difference value between the theoretical pupil value and the actual pupil value, and obtaining an adjustment parameter, the adjustment parameter being used for instructing to adjust a display effect of a first perception picture;
    generating a control signal according to the adjustment parameter; and
    adjusting a display parameter of the display device based on the control signal to correspondingly adjust the display effect of the first perception picture,
    wherein the first perception picture is perceived by one eye of the user, before obtaining the adjustment parameter, the method further comprises:
    detecting a first pupil value corresponding to each display effect of the different display effects of the first perception picture perceived by the one eye of the user and a second pupil value of the other eye of the user;
    judging a difference value between the first pupil value corresponding to each display effect and the second pupil value;
    when a third difference value between the first pupil value under the first display effect and the second pupil value is no greater than a first threshold, recording the current display parameter, and generating a set of display parameters.

2. The method according to claim 1, wherein before obtaining the adjustment parameter, the method further comprises:
    controlling the display device to set different display parameters according to a predetermined rule;
    detecting an actual pupil value corresponding to each display effect of the different display effects of the first perception picture;
    judging a difference value between the theoretical pupil value corresponding to each display effect and the actual pupil value corresponding to each display effect;
    adjusting the display parameter of the display device when a first difference value between the theoretical pupil value under a first display effect and the actual pupil value under the first display effect meets a predetermined condition, to restore the actual pupil value under the first display effect to the theoretical pupil value under the first display effect;
    recording current display parameter, and generating a set of display parameters.

3. The method according to claim 2, wherein when the first difference value between the theoretical pupil value under the first display effect and the actual pupil value under the first display effect does not meet the predetermined condition, the obtaining the adjustment parameter comprises:
    when the first difference value is greater than zero, obtaining an adjustment signal generated when the display parameter of the display device is decreased;
    when the first difference value is less than zero, obtaining an adjustment signal generated when the display parameter of the display device is increased.

4. The method according to claim 2, wherein when the first difference value between the theoretical pupil value under the first display effect and the actual pupil value under the first display effect does not meet the predetermined condition, the obtaining the adjustment parameter comprises determining a first adjustment value of the actual pupil value under the first display effect, according to the first difference value and the predetermined condition.

5. The method according to claim 4, wherein the generating a control signal according to the adjustment parameter comprises:

obtaining a first variation amount of the display parameter of the display device corresponding to the first adjustment value;

when the first difference value is greater than zero, generating a control signal for controlling the display parameter of the display device to be decreased by the first variation amount;

when the first difference value is less than zero, generating a control signal for controlling the display parameter of the display device to be increased by the first variation amount.

6. The method according to claim 5, wherein the adjusting display parameter of the display device based on the control signal to correspondingly adjust the display effect of the first perception picture comprises adjusting the display parameter of the display device based on the control signal, such that a second difference value between the actual pupil value under the current display effect of the first perception picture and the theoretical pupil value corresponding to the display effect of the first perception picture before the adjustment meets the predetermined condition.

7. The method according to claim 5, wherein, the method further comprises saving the actual pupil value corresponding to the display effect of the first perception picture after the adjustment and the display parameter corresponding to the display device.

8. The method according to claim 1, wherein when the functional main body section further comprises an adjusting device disposed in the frame body which adjusts the display effect of the first perception picture, the adjustment parameter is an adjustment signal generated by the adjusting device.

9. The method according to claim 1, wherein, when the absolute value of a third difference value between the first pupil value under the first display effect and the second pupil value is greater than the first threshold, the obtaining the adjustment parameter comprises:

when the third difference value is greater than zero, obtaining an adjustment signal generated when the display parameter of the display device is increased;

when the third difference value is less than zero, obtaining an adjustment signal generated when the display parameter of the display device is decreased.

10. The method according to claim 9, wherein, the adjusting display parameter of the display device based on the control signal to correspondingly adjust the display effect of the first perception picture comprises:

adjusting the display parameter of the display device based on the control signal, such that a fourth difference value between the first pupil value under the current display effect of the first perception picture and the second pupil value is no greater than the first threshold.

11. An electronic apparatus comprising:

a display device, configured to, upon a user viewing a first display content in a first display region of the display device in a first interactive mode, emit a light beam to be incident upon an eye of the user so that the user perceives a first perception picture, a size of the first perception picture being greater than that of the first display region, and the first interactive mode being that the user approaches the first display region of the display device;

a detecting device, configured for detecting an actual pupil value of the user by the light beam emitted by the display device incident upon the eye of the user in perceiving the first perception picture, the detecting device is further configured for detecting a first pupil value corresponding to each display effect of the different display effects of the first perception picture perceived by one eye of the user and a second pupil value of the other eye;

a first processing circuit, configured for obtaining a current display effect of the display device and a theoretical pupil value corresponding to the current display effect;

a second processing circuit, configured for judging a difference value between the theoretical pupil value and the actual pupil value;

a sensing device configured for obtaining an adjustment parameter, the adjustment parameter being used for instructing to adjust a display effect of a first perception picture;

a control circuit configured for generating a control signal according to the adjustment parameter of the sensing device;

an adjustment circuit configured for adjusting a display parameter of the display device based on the control signal to correspondingly adjust the display effect of the first perception picture;

a storage circuit, configured for, when a third difference value between the first pupil value under the first display effect and the second pupil value is no greater than a first threshold, recording the current display parameter, and generating a set of display parameters.

12. The electronic apparatus according to claim 11, wherein the first processing circuit is further configured for, before the sensing device obtains the adjustment parameter, controlling the display device to set different display parameters according to a predetermined rule;

the detecting device is further configured for detecting an actual pupil value corresponding to each display effect of the different display effects of the first perception picture;

the second processing circuit is further configured for judging a difference value between the theoretical pupil value and the actual pupil value under each display effect, and adjusting the display parameter of the display device when a first difference value between the theoretical pupil value under a first display effect and the actual pupil value under the first display effect meets a predetermined condition, to restore the actual pupil value under the first display effect to the theoretical pupil value under the first display effect;

the storage circuit is further configured for recording current display parameter of the display device processed by the second processing circuit and a set of generated display parameters.

13. The electronic apparatus according to claim 12, further comprising an adjusting device disposed in the frame body for adjusting the display parameter of the display device.

14. The electronic apparatus according to claim 13, wherein, when the first difference value between the theoretical pupil value under the first display effect and the actual pupil value under the first display effect does not meet the predetermined condition, the sensing device is used for obtaining an adjustment signal generated by the adjusting device.

15. The electronic apparatus according to claim 13, wherein, when the first difference value between the theoretical pupil value under the first display effect and the actual pupil value under the first display effect does not meet the predetermined condition, the sensing device is used for determining a first adjustment value of the actual pupil value under the first display effect according to the first difference value and the predetermined condition.

16. The electronic apparatus according to claim 15, wherein the control circuit is used for executing operations of:
   obtaining a first variation amount of the display parameter of the display device corresponding to the first adjustment value;
   when the first difference value is greater than zero, generating a control signal for controlling the display parameter of the display device to be decreased by the first variation amount;
   when the first difference value is less than zero, generating a control signal for controlling the display parameter of the display device to be increased by the first variation amount.

17. The electronic apparatus according to claim 16, wherein the adjustment circuit is used for adjusting the display parameter of the display device based on the control signal, such that a second difference value between the actual pupil value under a current display effect of the first perception picture and the theoretical pupil value corresponding to the display effect of the first perception picture before the adjustment meets the predetermined condition.

* * * * *